(12) United States Patent
Viet et al.

(10) Patent No.: US 12,099,870 B2
(45) Date of Patent: Sep. 24, 2024

(54) REDUCING CALL STACK USAGE FOR FUTURE OBJECT COMPLETIONS

(71) Applicant: Red Hat, Inc., Raleigh, NC (US)

(72) Inventors: Julien Viet, Paris la Defense (FR); Thomas Segismont, Paris la Defense (FR)

(73) Assignee: Red Hat, Inc., Raleigh, NC (US)

( * ) Notice: Subject to any disclaimer, the term of this patent is extended or adjusted under 35 U.S.C. 154(b) by 593 days.

(21) Appl. No.: 17/464,124

(22) Filed: Sep. 1, 2021

(65) Prior Publication Data
US 2023/0064547 A1    Mar. 2, 2023

(51) Int. Cl.
| | | |
|---|---|---|
| *G06F 9/30* | (2018.01) | |
| *G06F 8/30* | (2018.01) | |
| *G06F 9/38* | (2018.01) | |
| *G06F 9/48* | (2006.01) | |
| *G06F 9/54* | (2006.01) | |

(52) U.S. Cl.
CPC ............ *G06F 9/4881* (2013.01); *G06F 8/315* (2013.01); *G06F 9/3009* (2013.01); *G06F 9/3871* (2013.01); *G06F 9/544* (2013.01)

(58) Field of Classification Search
CPC ...... G06F 9/4881; G06F 8/315; G06F 9/3009; G06F 9/3871; G06F 9/544; G06F 9/4491
See application file for complete search history.

(56) References Cited

U.S. PATENT DOCUMENTS

| | | | |
|---|---|---|---|
| 9,015,689 B2 | 4/2015 | Bai et al. | |
| 10,089,126 B2 | 10/2018 | Rugina et al. | |
| 10,901,755 B2 | 1/2021 | Ellison et al. | |
| 10,922,062 B2 | 2/2021 | Venka et al. | |
| 2014/0282454 A1* | 9/2014 | Bai | G06F 9/50 |
| | | | 717/157 |
| 2014/0289726 A1* | 9/2014 | Rugina | G06F 11/3466 |
| | | | 718/1 |
| 2016/0321046 A1* | 11/2016 | Pizlo | G06F 8/443 |

(Continued)

OTHER PUBLICATIONS

Author Unknown, "Debugging a Stack Overflow," Microsoft, Mar. 23, 2021, https://docs.microsoft.com/en-us/windows-hardware/drivers/debugger/debugging-a-stack-overflow, 11 pages.

(Continued)

*Primary Examiner* — Brian W Wathen
(74) *Attorney, Agent, or Firm* — Dority & Manning, P.A.

(57) ABSTRACT

Reducing call stack usage for future object completions is disclosed herein. In one example, a processor device of a computing device employs a completion queue when managing completions of future objects. When a future object is determined to have a status of complete, the processor device determines whether the current thread of the future object is associated with a completion queue. If so, a completion operation of the future object is enqueued in the completion queue. If the current thread is not associated with a completion queue, one is created and associated with the current thread, and the completion operation of the future object is performed. After completion, if the completion queue is not empty, any enqueued completion operations are dequeued and performed. Once the completion queue is empty, the completion queue is removed.

20 Claims, 7 Drawing Sheets

(56) References Cited

U.S. PATENT DOCUMENTS

2018/0107465 A1\* 4/2018 Silbermintz ............ G06F 8/447
2021/0089400 A1 3/2021 Kashani et al.

OTHER PUBLICATIONS

Ralston, M., "Tail Call Elimination in the OpenSmallTalk Virtual Machine," Thesis in partial fulfillment of the requirements for the degree of Master of Science in the program of Computer Science, University of Windsor, Toronto, Ontario, Canada, 2019, https://digital.library.ryerson.ca/islandora/object/RULA%3A8564, 116 pages.
Saboff, M., "ECMAScript 6 Proper Tail Calls in WebKit," WebKit, May 23, 2016, https://webkit.org/blog/6240/ecmascript-6-proper-tail-calls-in-webkit/, 14 pages.

\* cited by examiner

← 76

```
      import java.util.function.Consumer;

public class Main {
           static ThreadLocal<LinkedList<Runnable> local = new
      ThreadLocal<>();

78         public static void main(String[] args) {
80             Future future1 = new Future();
82             Future future2 = new Future();
84             Future future3 = new Future();
86             future1.listener = s → future2.complete(s);
88             future2.listener = s → future3.complete(s);
90             future3.listener = s → {
92                 System.out.println(s);
               };
94             future1.complete("hello world");
           } static class Future {
               Consumer<String> listener;

void complete(String s){
96                 LinkedList<Runnable> c_queue = local.get();
98                 if (c_queue == null) {
100                    c_queue = new LinkedList<>();
102                    local.set(c_queue);
104                    listener.accept(s);
106                    while (!c_queue.isEmpty()) {
108                        Runnable elt = c_queue.remove();
110                        elt.run();
                       }
112                    local.remove();
                   } else {
114                    c_queue.add(() → {
116                        listener.accept(s);
                       });
                   }
               }
           }
      }
```

*FIG. 4*

REDUCING CALL STACK USAGE FOR FUTURE OBJECT COMPLETIONS

BACKGROUND

Applications that use asynchronous computations may employ future objects, which are programming constructs that represent a result of an asynchronous computation. Multiple future objects may be linked such that the result of an asynchronous computation associated with a first future object may be used as input for another asynchronous computation associated with a second, "downstream" future object. Conventional implementations of future objects use a current thread's call stack to store data related to the completion of future objects and the notifications between future objects.

SUMMARY

The examples disclosed herein relate to reducing call stack usage for future object completions. In some examples, a processor device of a computing device uses to manage completions of future objects. Use of the completion queue instead of the current thread's call stack results provides improved system performance and reduces the occurrence of call stack overflow errors, particularly in scenarios employing a lengthy series of linked future objects.

In another example, a computing device is provided. The computing device comprises a system memory and a processor device communicatively coupled to the system memory. The processor device is to determine, in a current thread, that a first future object representing a result of a first asynchronous operation has a status of complete. The processor device is further to determine that the current thread is not associated with a completion queue. The processor device is also to, responsive to determining that the current thread is not associated with a completion queue, create a completion queue associated with the current thread. The processor device is additionally to perform a completion operation of the first future object. The processor device is further to determine, in the current thread as a result of performing the completion operation of the first future object, that a second future object representing a result of a second asynchronous operation has a status of complete. The processor device is also to determine that the current thread is associated with the completion queue. The processor device is additionally to, responsive to determining that the current thread is associated with the completion queue, enqueue a completion operation of the second future object in the completion queue.

In another example, a method is provided. The method comprises determining, by a processor device in a current thread, that a first future object representing a result of a first asynchronous operation has a status of complete. The method further comprises determining that the current thread is not associated with a completion queue. The method also comprises, responsive to determining that the current thread is not associated with a completion queue, creating a completion queue associated with the current thread. The method additionally comprises performing a completion operation of the first future object. The method further comprises determining, by the processor device in the current thread as a result of performing the completion operation of the first future object, that a second future object representing a result of a second asynchronous operation has a status of complete. The method also comprises determining that the current thread is associated with the completion queue. The method additionally comprises, responsive to determining that the current thread is associated with the completion queue, enqueuing a completion operation of the second future object in the completion queue.

In another example, a non-transitory computer-readable medium is provided. The computer-readable medium stores computer-executable instructions that, when executed, cause one or more processor devices to determine, in a current thread, that a first future object representing a result of a first asynchronous operation has a status of complete. The computer-executable instructions further cause the one or more processor devices to determine that the current thread is not associated with a completion queue. The computer-executable instructions also cause the one or more processor devices to, responsive to determining that the current thread is not associated with a completion queue, create a completion queue associated with the current thread. The computer-executable instructions additionally cause the one or more processor devices to perform a completion operation of the first future object. The computer-executable instructions further cause the one or more processor devices to determine, in the current thread as a result of performing the completion operation of the first future object, that a second future object representing a result of a second asynchronous operation has a status of complete. The computer-executable instructions also cause the one or more processor devices to determine that the current thread is associated with the completion queue. The computer-executable instructions additionally cause the one or more processor devices to, responsive to determining that the current thread is associated with the completion queue, enqueue a completion operation of the second future object in the completion queue.

Individuals will appreciate the scope of the disclosure and realize additional aspects thereof after reading the following detailed description of the examples in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

FIG. 4 is a sample of Java code illustrating the use of the completion queue of FIG. 2, according to one example;

DETAILED DESCRIPTION

Figure 1:
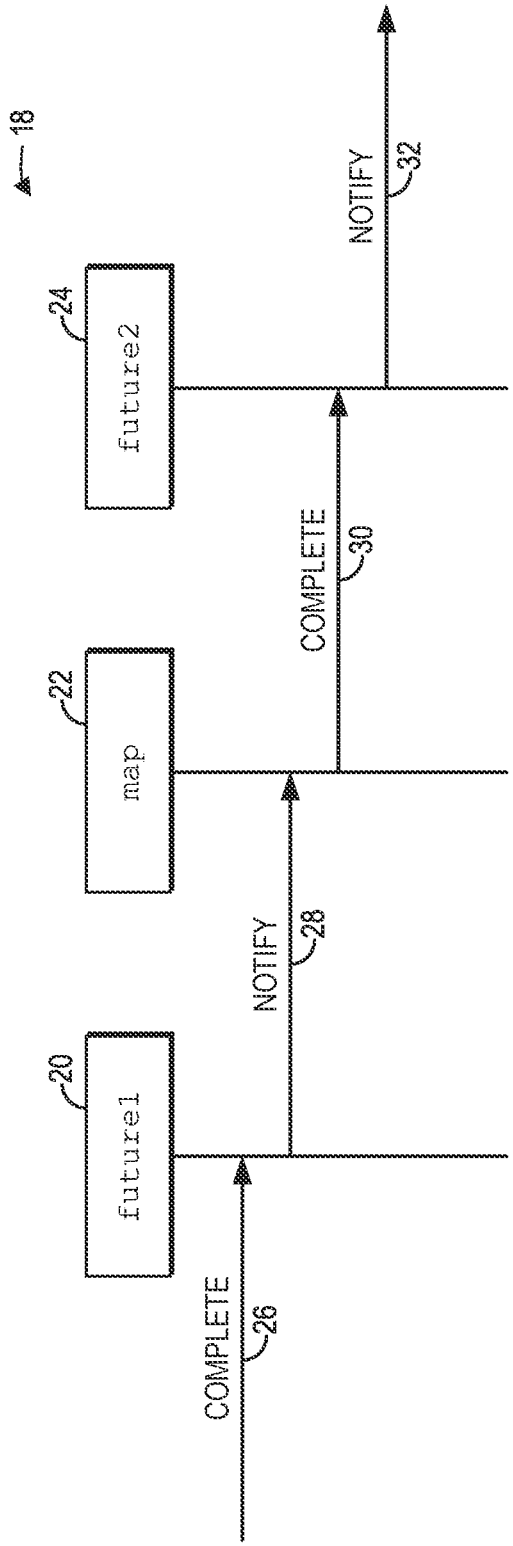
FIGS. 1A and 1B illustrate usage of conventional future objects and links for future object completion and notification of downstream listeners.

The examples set forth below represent the information to enable individuals to practice the examples and illustrate the best mode of practicing the examples. Upon reading the following description in light of the accompanying drawing figures, individuals will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the examples are not limited to any particular sequence of steps. The use herein of ordinals in conjunction with an element is solely for distinguishing what might otherwise be similar or identical labels, such as "first future object" and "second future object," and does not imply a priority, a type, an importance, or other attribute, unless otherwise stated herein. The term "about" used herein in conjunction with a numeric value means any value that is within a range of ten percent greater than or ten percent less than the numeric value. As used herein and in the claims, the articles "a" and "an" in reference to an element refers to "one or more" of the element unless otherwise explicitly specified. The word "or" as used herein and in the claims is inclusive unless contextually impossible. As an example, the recitation of A or B means A, or B, or both A and B.

Applications that use asynchronous computations may employ future objects, which are programming constructs that represent a result of an asynchronous computation. Multiple future objects may be linked such that the result of an asynchronous computation associated with a first future object may be used as input for another asynchronous computation associated with a second, "downstream" future object. Conventional implementations of future objects use a current thread's call stack to store data related to the completion of future objects and the notifications between future objects. However, this may result in a large call stack that negatively impacts system performance. For example, an excessively large call stack may result in just-in-time (JIT) compilers being unable to perform method inlining (in which the JIT compiler replaces invocations of most-often-executed methods with the methods' bodies). Due to limitations of a thread's call stack depth, an excessively large call stack may even result in the occurrence of stack overflow errors during code execution.

Accordingly, the examples disclosed herein relate to reducing call stack usage for future object completions. In some examples, a processor device of a computing device employs a completion queue, which functions in a manner analogous to tail call mechanisms used to eliminate tail recursion in recursive functions, to reduce the usage of a thread's call stack size when managing completions of future objects. When a future object is determined to have a status of complete (i.e., because an asynchronous operation that returned the future object has resulted in either a successful or unsuccessful outcome), the processor device determines whether the current thread of the future object is associated with a completion queue. If so, a completion operation of the future object is enqueued in the completion queue. If the current thread is not associated with a completion queue, one is created and associated with the current thread, and the completion operation of the future object is performed. After completion, if the completion queue is not empty, any enqueued completion operations are dequeued and performed. Once the completion queue is empty, the completion queue is removed.

In some examples, the future object comprises an instantiation of a custom class implemented using an object-oriented programming language, while some examples may provide that the future object comprises an instantiation of a Java Future class. In the latter examples, the completion operation may comprise a custom method (i.e., a method added to the Java Future class, or an overridden default method of the Java Future class). According to some examples, the completion queue may be implemented as an instantiation of a Java LinkedList class, while some examples may provide that the completion queue is associated with a current thread using the Java ThreadLocal class.

Before describing operations for using a completion queue to reduce call stack usage for future object completions, conventional approaches to implementing future objects for handling asynchronous operations are first discussed. In this regard, it is to be understood that computations performed by a computer program can be broadly classified as either synchronous or asynchronous. A synchronous computation is one that requires a calling program to halt further progress until the synchronous computation completes, either successfully (in which case a result of the computation may be returned) or unsuccessfully (in which case an error code may be returned or an exception may be raised). A synchronous computation that takes a relatively long time to complete may result in a delay that is noticeable to users. An asynchronous computation, in contrast, allows the calling program to invoke the computation and then continue executing further instructions without waiting for the asynchronous computation to complete. For instance, the calling program may invoke the asynchronous computation, and while the asynchronous computation is executing, may update a display to inform the user of the operating state of the program, provide the user with an opportunity to cancel the operation, and/or carry out other operations while awaiting the result of the asynchronous computation.

Because the calling program may have progressed on to executing further instructions by the time the asynchronous computation completes, a mechanism must be provided for determining that the asynchronous computation has completed and for retrieving a result of the asynchronous computation. Modern programming languages such as Java provide such a mechanism in the form of future objects. The term "future object" and derivatives thereof are used herein to refer to programming constructs (whether object-oriented or not) that represent a result of an asynchronous computation, and that provide operations to determine whether the computation is complete, to wait for its completion, and to retrieve the result of the computation. Future objects may be included as a feature of a programming language (e.g., the Java Future class), or may be manually implemented by a programmer. A future object may maintain an internal list of listeners (i.e., other future objects or functions) that are notified when the future object completes (i.e., when the asynchronous computation associated with the future object resolves successfully or unsuccessfully). Multiple future objects may be linked, such that the result of an asynchronous operation associated with a first future object may be used as input for another synchronous operation associated with a second, "downstream" future object.

FIGS. 1A and 1B illustrate the usage of conventional future objects and links for future object completion and notification of downstream listeners. FIG. 1A provides a code excerpt 10 that demonstrates how two future objects, future1 and future2, may be linked. At line 12, an asynchronous function getValueAsync( ), which returns a Future object future1, is invoked. At this point, future1 is created and getValueAsync( ) begins asynchronous execution while line 14 in the code excerpt 10 is executed. At line 14, the map method of future1 is used to create a new Future object, future2, which is associated with a method s.length( ) that will be invoked using the string s that will be returned when future1 completes. Finally, at line 16, the method future2.onComplete is used to call a function performAction (result) upon completion of future2, where the parameter result is the integer value returned when future2 completes. It is to be understood that lines 12-16 are executed one after another when the code excerpt 10 is executed, but because the getValueAsync( ) function is asynchronous, a period of time may elapse before future1 and future2 both complete.

FIG. 1B provides a diagram 18 that illustrates links between future1 of FIG. 1A (represented by block 20), the mapping function referenced in line 14 of FIG. 1A (represented by block 22), and future2 of FIG. 1A (represented by block 24). The asynchronous function getValueAsync( ), which returns future1 when called, is linked to future1 such that the status of future1 is updated to complete when the getValueAsync( ) function completes, as indicated by arrow 26. The completion of future1 is then linked to the map function, such that the map function is notified of the completion of future1 so that the method s.length( ) can be executed, as indicated by arrow 28. The map function, which returns future2 when called, is linked to future2 such that the status of future2 is updated to complete when the method s.length( ) completes, as indicated by arrow 30. Finally, the completion of future2 is linked to the method future2.onComplete, such that future2.onComplete is notified of the completion of future2 so that the performAction (result) function can be executed, as indicated by arrow 32. In this manner, the completion of the upstream future object future1 can lead to a cascade of downstream future object completions and notifications on the same thread of execution.

However, as noted above, conventional implementations of future objects use the call stack of the current thread to store data related to the completion of future objects and the notifications between future objects illustrated in FIG. 1B. This may result in an excessively large call stack that negatively impacts system performance by, for instance, preventing JIT compilers from performing method inlining, and/or by increasing the occurrence of stack overflow errors during code execution if hard limitations on the call stack size exist.

Figure 2:
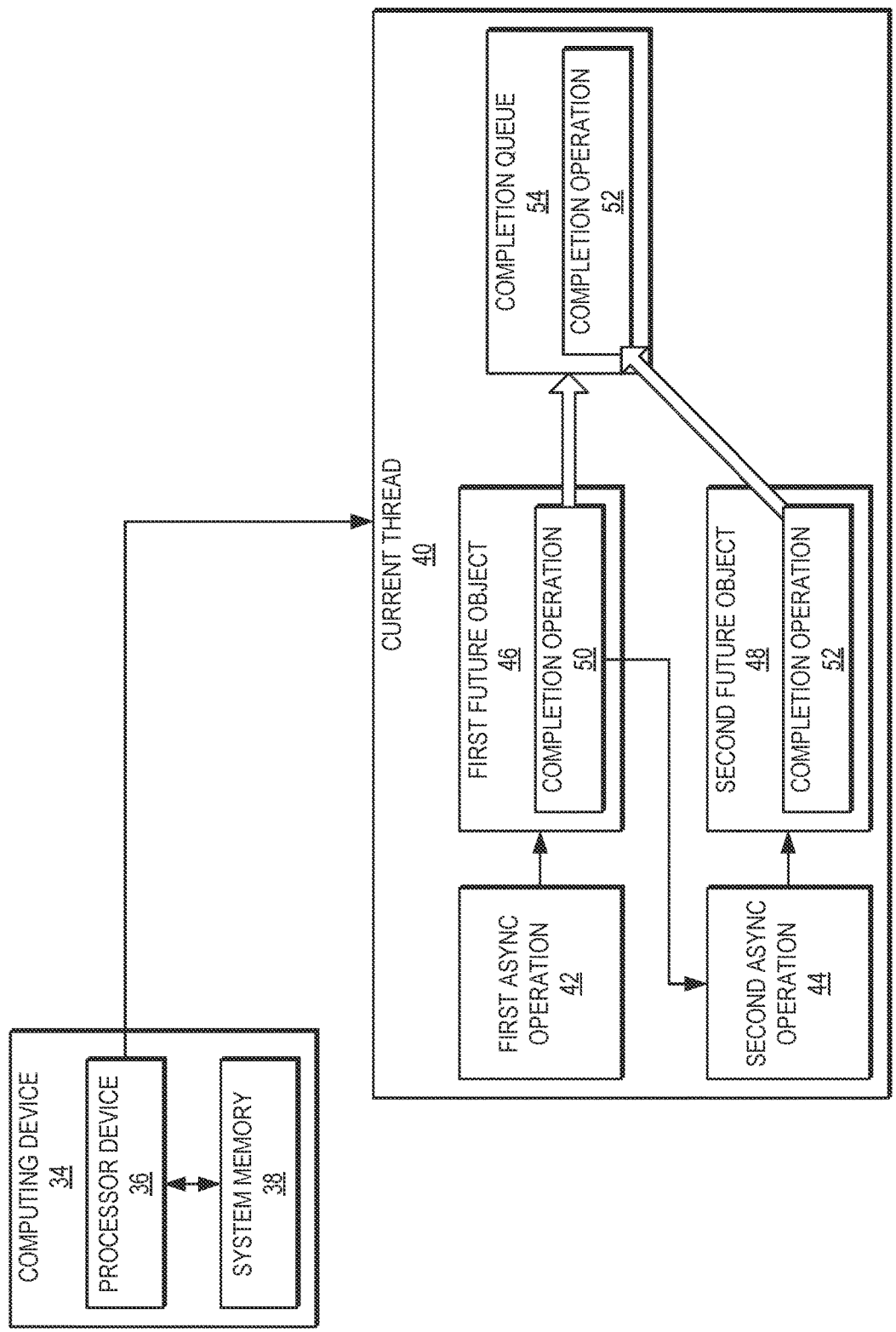
FIG. 2 is a block diagram of a computing device in which examples may be practiced.

Accordingly, the examples disclosed herein relate to reducing call stack usage for future object completions. To illustrate a computing device on which examples may be practiced, FIG. 2 is provided. In FIG. 2, a computing device 34 includes a processor device 36 communicatively coupled to a system memory 38. The computing device 34 of FIG. 2 and the constituent elements thereof may encompass any one of known digital logic elements, semiconductor circuits, processing cores, and/or memory structures, among other elements, or combinations thereof. Examples described herein are not restricted to any particular arrangement of elements, and it is to be understood that some examples of the computing device 34 may include more or fewer elements than illustrated in FIG. 2. For example, the processor device 36 may further include one or more functional units, instruction caches, unified caches, memory controllers, interconnect buses, and/or additional memory devices, caches, and/or controller circuits, which are omitted from FIG. 2 for the sake of clarity.

In the example of FIG. 2, the processor device 36 executes a program (not shown) within a current thread 40, which comprises an executable thread of the processor device 36. The program executing within the current thread 40 makes use of a first asynchronous operation (captioned as "FIRST ASYNC OPERATION" in FIG. 2) 42 and a second asynchronous operation (captioned as "SECOND ASYNC OPERATION" in FIG. 2) 44. The first asynchronous operation 42 and the second asynchronous operation 44 each represents a function or method that performs an asynchronous computation, and that returns a future object that provides operations for determining whether the computation is complete, to wait for its completion, and to retrieve the result of the computation. As seen in FIG. 2, the first asynchronous operation 42 returns a first future object 46, while the second asynchronous operation 44 returns a second future object 48.

The first future object 46 comprises a completion operation 50, which comprises one or more operations, instructions, or computations that are to be performed when the first asynchronous operation 42 completes and the first future object 46 has a status of complete. Likewise, the second future object 48 comprises a completion operation 52 to be performed when the second asynchronous operation 44 completes and the second future object 48 has a status of complete.

In the example of FIG. 2, the completion operation 50 of the first future object 46 invokes the second asynchronous operation 44 that returns the second future object 48, in a manner analogous to the relationship between future1 and future2 in FIG. 1A. Accordingly, to reduce the usage of the call stack (not shown) of the current thread 40 when managing completions of the first future object 46 and the second future object 48, the processor device 36 is configured to make use of a completion queue 54. As discussed in greater detail below with respect to FIGS. 3 and 4, when a future object such as the first future object 46 is determined to have a status of complete, the processor device 36 determines whether the current thread 40 is associated with the completion queue 54. If not, the completion queue 54 is created and associated with the current thread 40, and the completion operation 50 of the first future object 46 is performed. After completion, if the completion queue 54 is not empty, any enqueued completion operations (such as the completion operation 52 of the second future object 48, which may be enqueued as a result of the completion operation 50 of the first future object 46) are dequeued and performed. Once the completion queue 54 is empty, the completion queue 54 is removed. It is to be understood that such use of the completion queue 54 to reduce call stack usage for future objects can be considered analogous to tail call mechanisms used to eliminate tail recursion in recursive functions.

Some examples may provide that the first future object 46 and the second future object 48 each comprises an instantiation of a custom class implemented using an object-oriented programming language, while some examples may provide that the first future object 46 and the second future object 48 each comprises an instantiation of a Java Future class. In the latter examples, the completion operations 50 and 52 each may comprise a custom method (i.e., a method added to the Java Future class, or an overridden default method of the Java Future class). According to some examples, the completion queue 54 may be implemented as an instantiation of a Java LinkedList class, while some examples may provide that the completion queue 54 is associated with a current thread using the Java ThreadLocal class.

It is to be understood that, because the first future object 46 and the second future object 48 may comprise software instructions that program the processor device 36 to carry out the functionality discussed herein, functionality implemented by the first future object 46 and the second future object 48 may be attributed herein to the processor device 36 and/or to the computing device 34. Moreover, it is noted that while, for purposes of illustration and simplicity, the examples are illustrated as being implemented by a processor device set that includes a single processor device on a single computing device, in other environments, such as a distributed and/or clustered environment, the examples may be implemented on a computer system that includes a processor device set that includes a plurality of processor devices of a plurality of different computing devices, and functionality of the examples may be implemented on different processor devices of different computing devices. Thus, irrespective of the implementation, the examples may be implemented on a computer system that includes a processor device set made up of one or more processor devices of one or more computing devices.

Figure 3:
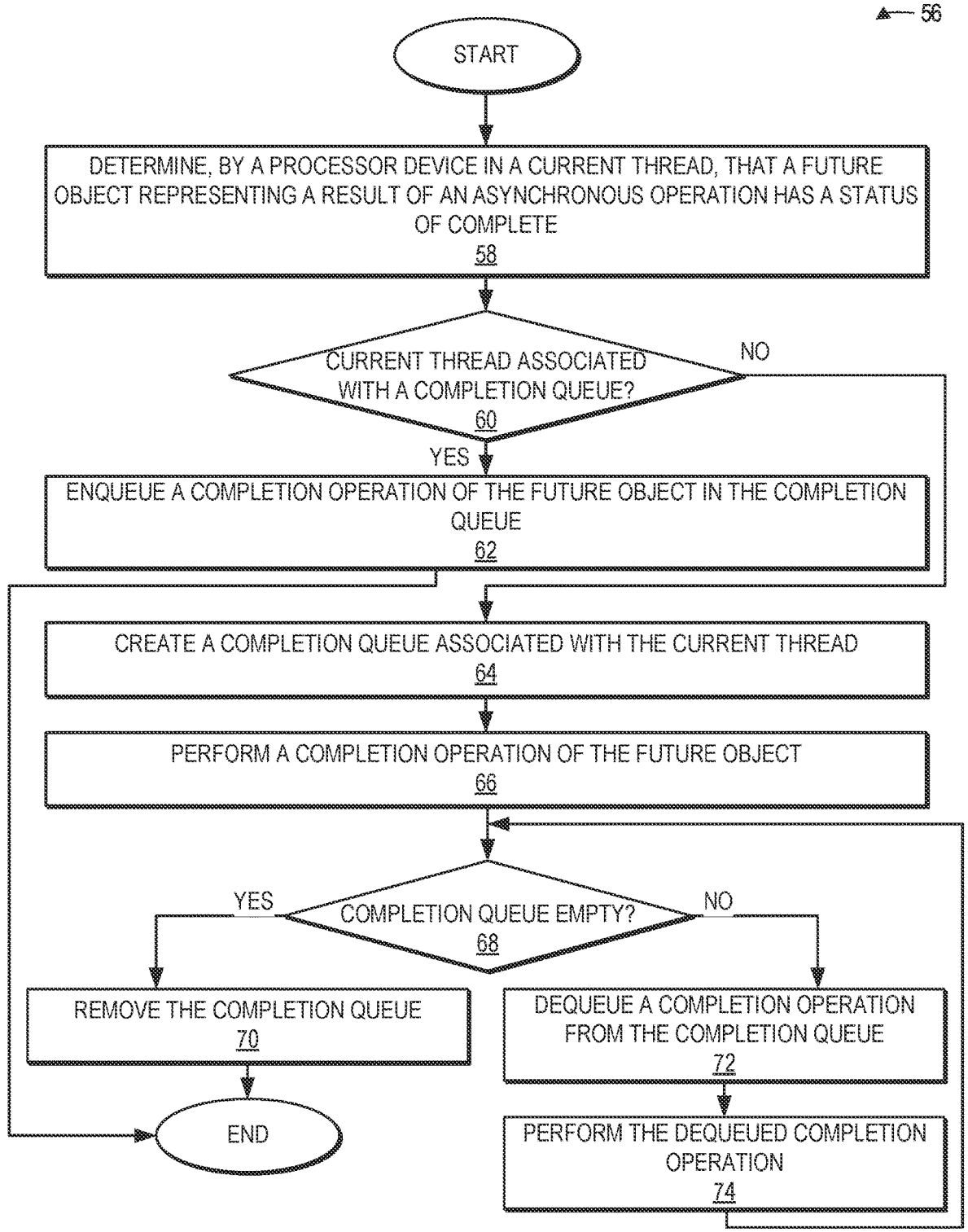
FIG. 3 is a flowchart illustrating an exemplary logical flow performed by a future object for reducing call stack usage for future object completions, according to one example.

FIG. 3 provides a flowchart 56 to illustrate exemplary operations for reducing call stack usage for future object completions from the perspective of a single future object, such as the first future object 46 of FIG. 2 (also referred to herein as "future object 46"). Elements of FIG. 2 are referenced in describing FIG. 3 for the sake of clarity. In FIG. 3, operations begin with the processor device 36 determining, in a current thread (e.g., the current thread 40 of FIG. 2), that the future object 46 representing a result of an asynchronous operation (e.g., the first asynchronous operation 42 of FIG. 2) has a status of complete (block 58). The processor device 36 next determines whether the current thread 40 is associated with a completion queue (e.g., the completion queue 54 of FIG. 2) (block 60). If so, the processor device 36 enqueues a completion operation (e.g., the completion operation 50 of FIG. 2) of the future object 46 in the completion queue 54 (block 62). The processor device 36 then continues execution.

However, if the processor device 36 determines at decision block 60 that the current thread 40 is not associated with a completion queue, the processor device 36 creates the completion queue 54 associated with the current thread 40 (block 64). The processor device 36 then performs the completion operation 50 of the future object 46 (block 66). After the future object 46 completes, the processor device 36 determines whether the completion queue 54 is empty (block 68). If so, the processor device 36 removes the completion queue 54 (block 70). If the processor device 36 determines at decision block 68 that the completion queue 54 is not empty, the processor device 36 dequeues a completion operation (such as the completion operation 52 of the second future object 48 of FIG. 2) from the completion queue 54 (block 72). The processor device 36 next performs the dequeued completion operation 52 (block 74). Finally, processing returns to the decision block 68.

FIG. 4 provides a sample code excerpt 76 to provide an example of the lifecycle of a completion queue such as the completion queue 54 of FIG. 2. It is to be understood that, for the sake of simplicity, objects of the Future class referenced in the code excerpt 76 are not associated with or returned by an asynchronous operation, as would be the case with the first future object 46 and the second future object 48 of FIG. 2. It is to be further understood that functionality similar to that shown in the complete(s) method for creating, populating and depopulating, and removing the completion queue would be performed upon a determination that a future object has a status of complete (i.e., upon the future object receiving an indication that an associated asynchronous operation completed).

In the example of FIG. 4, upon executing the main( ) function beginning at line 78, three Future objects—future1, future2, and future3—are instantiated at lines 80, 82, and 84, respectively. At line 86, the listener attribute of future1 (which is a Java Consumer in this example) is assigned the lambda expression s→future2.complete(s), while at line 88 the listener attribute of future2 is similarly assigned the lambda expression s→future3.complete(s). At lines 90 and 92, the listener attribute of future3 is assigned the lambda expression s→{System.out.println(s);}. Finally, the complete(s) method of future1 is invoked at line 94, with the string "hello world" as the input parameter s.

The execution of the method future1.complete(s) begins at line 96, where an attempt is made to access a completion queue ("c_queue"). It is determined at line 98 that c_queue does not yet exist, and so c_queue is created at lines 100 and 102. The method listener.accept(s), which represents a completion operation for future1 analogous to the completion operations 50 and 52 of FIG. 2, is then executed at line 104. Because the method listener.accept(s) of future1 is set to invoke the method future2.complete(s), the effect is that the method future2.complete(s) is executed, with the string "hello world" as the input parameter s.

Thus, the execution of future2.complete(s) begins back at line 96, where an attempt again is made to access c_queue. It is determined at line 98 that c_queue does exist, so future2 adds its listener.accept(s) method call (representing its completion operation, and set to invoke the method future3.complete(s)) to c_queue at lines 114 and 116. Execution of the method future2.complete(s) then ends, and processing resumes in the method future1.complete(s) at line 106.

At line 106, processing of the contents of c_queue begins in the method future1.complete(s). After determining at line 106 that c_queue is not empty, the topmost content of c_queue (i.e., the invocation of the method future3.complete(s) added by future2) is removed at line 108 and executed at line 110. This results in the invocation of the method future3.complete(s), with "hello world" as the input parameter s.

The execution of the method future3.complete(s) then begins back at line 96, where an attempt is made to access c_queue. It is determined at line 98 that c_queue does exist, so future3 adds its listen.accept(s) method call (representing its completion operation, and set to invoke System.out.println(s)) to c_queue at lines 114 and 116. Execution of the method future3.complete(s) then ends, and processing resumes in the method future1.complete(s) at line 106.

The processing of the contents of c_queue is still taking place in the method future1.complete(s), so at line 106 it is determined that c_queue is not empty. The topmost content of c_queue (i.e., the invocation of System.out.println(s) added by future3) is removed at line 108 and executed at line 110. This results in the string "hello world" being output to a monitor. At line 106, it is determined that c_queue is empty, and consequently c_queue is removed at line 112, and processing ends.

Figure 5A:
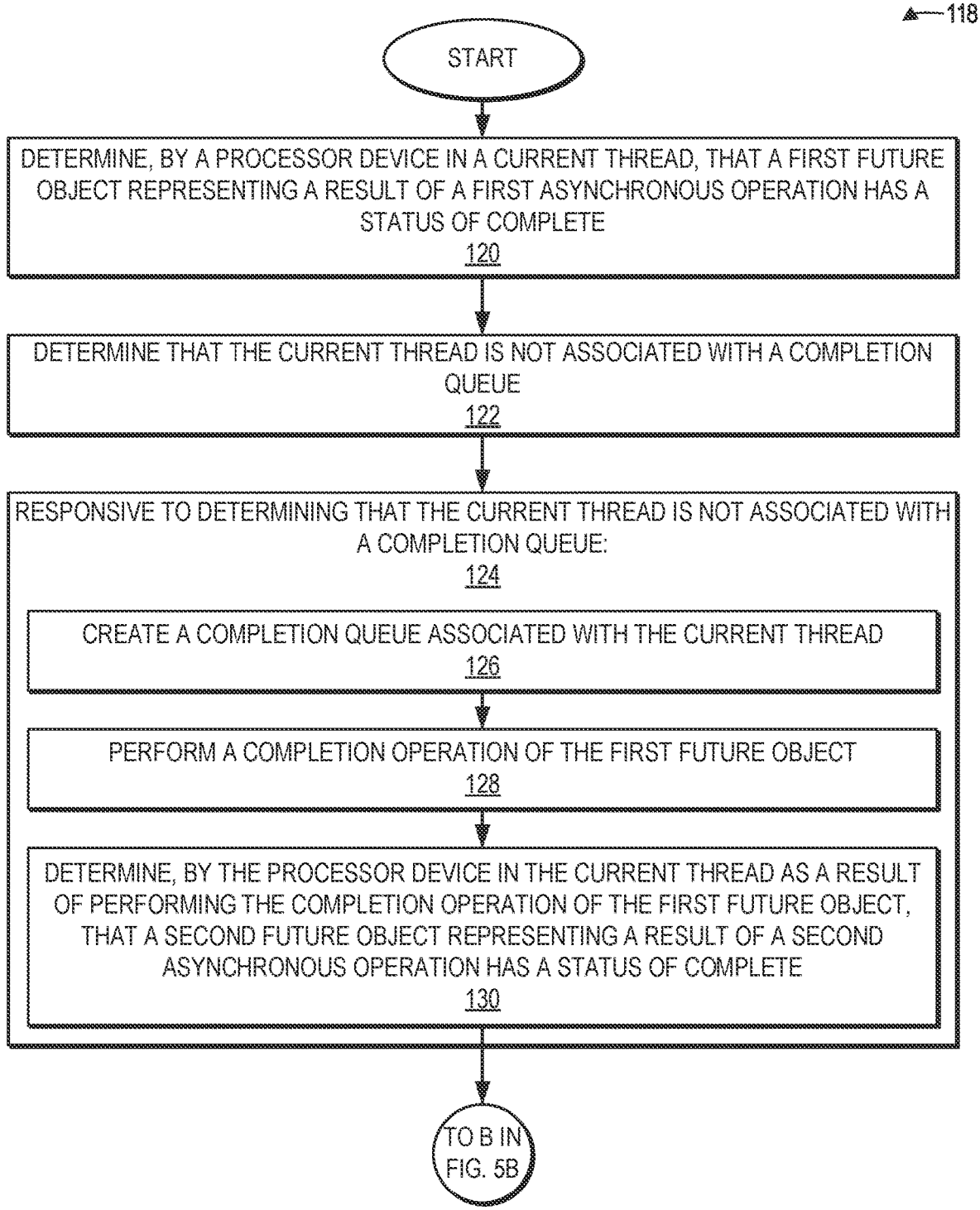
FIGS. 5A and 5B are flowcharts illustrating exemplary operations performed by future objects for reducing call stack usage for future object completions, according to one example.
Figure 5B:
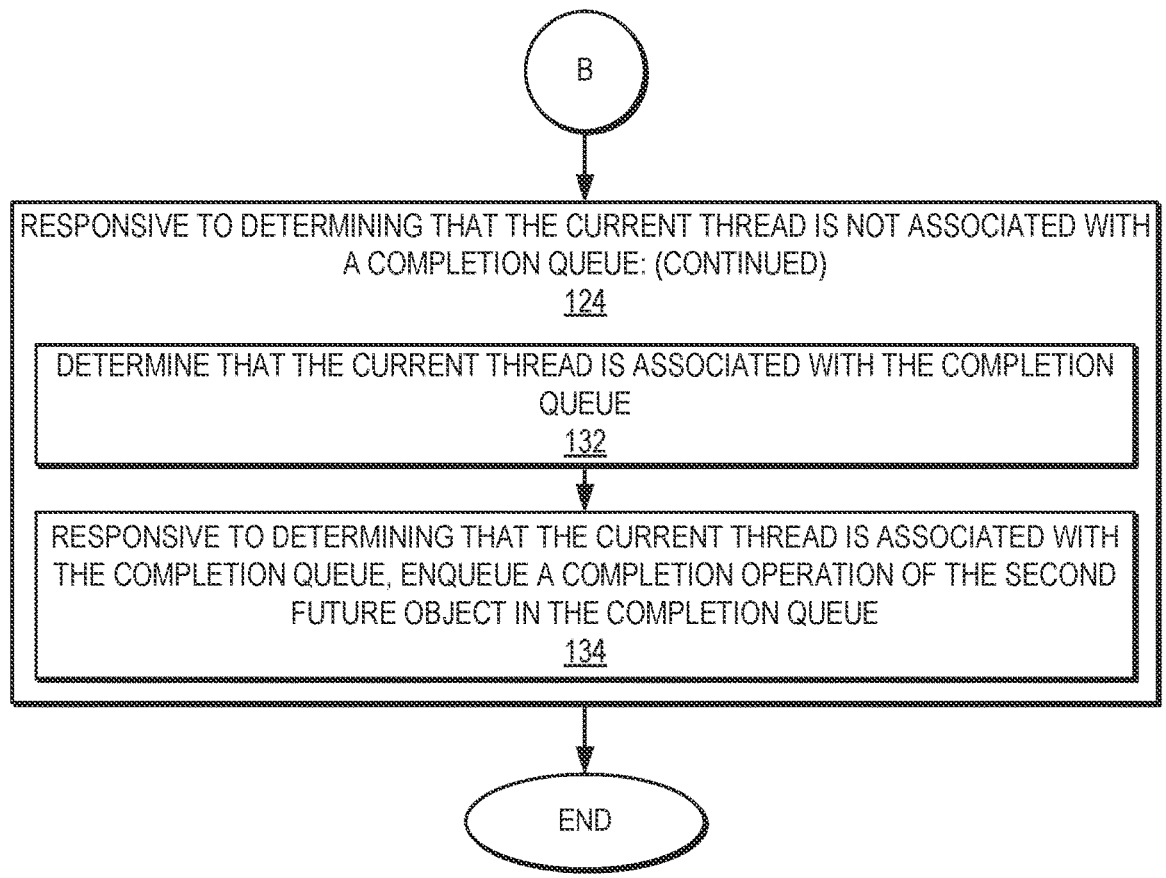

FIGS. 5A and 5B provide a flowchart 118 to illustrate exemplary operations for reducing call stack usage for future object completions from the perspective of the processor device 36 of FIG. 2 executing the first future object 46 and the second future object 48 of FIG. 2. Elements of FIG. 2 are referenced in describing FIGS. 5A and 5B. In FIG. 5A, operations begin with the processor device 36 determining, in a current thread 40, that the first future object 46 representing a result of a first asynchronous operation (e.g., the first asynchronous operation 42 of FIG. 2) has a status of complete (block 120). The processor device 36 then determines that the current thread 40 is not associated with a completion queue (such as the completion queue 54 of FIG. 2) (block 122). Responsive to determining that the current thread 40 is not associated with a completion queue 54, the processor device 36 then performs a series of operations (block 124). The processor device 36 creates the completion queue 54 associated with the current thread 40 (block 126). The processor device 36 next performs a completion operation (e.g., the completion operation 50 of FIG. 2) of the first future object 46 (block 128). The processor device 36 then determines, in the current thread 40 as a result of performing the completion operation 50 of the first future object 46, that the second future object 48 representing a result of a second asynchronous operation (e.g., the second asynchronous operation 44 of FIG. 2) has a status of complete (block 130). Operations then continue at block 132 of FIG. 5B.

Turning now to FIG. 5B, the operations of block 124 of FIG. 5A performed responsive to determining that the current thread 40 is not associated with a completion queue 54 continue. The processor device 36 next determines that the current thread 40 is associated with the completion queue 54 (block 132). Responsive to determining that the current thread 40 is associated with the completion queue 54, the processor device 36 enqueues a completion operation 52 of the second future object 48 in the completion queue 54 (block 134).

Figure 6:
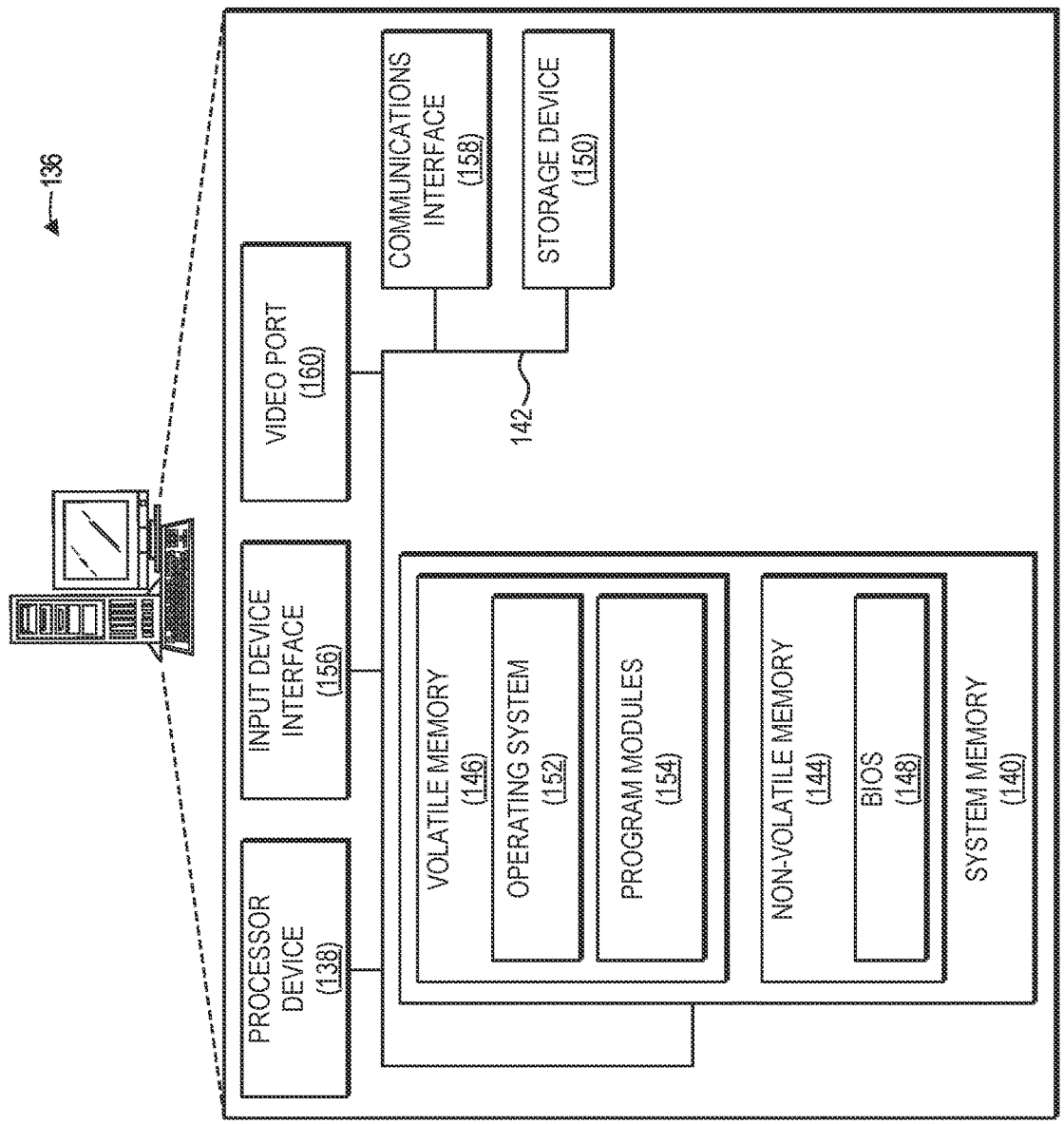
FIG. 6 is a block diagram of a computing device suitable for implementing examples, according to one example.

FIG. 6 is a block diagram of a computing device 136, such as the computing device 34 of FIG. 2, suitable for implementing examples according to one example. The computing device 136 may comprise any computing or electronic device capable of including firmware, hardware, and/or executing software instructions to implement the functionality described herein, such as a computer server, a desktop computing device, a laptop computing device, a smartphone, a computing tablet, or the like. The computing device 136 includes a processor device 138, a system memory 140, and a system bus 142. The system bus 142 provides an interface for system components including, but not limited to, the system memory 140 and the processor device 138. The processor device 138 can be any commercially available or proprietary processor.

The system bus 142 may be any of several types of bus structures that may further interconnect to a memory bus (with or without a memory controller), a peripheral bus, and/or a local bus using any of a variety of commercially available bus architectures. The system memory 140 may include non-volatile memory 144 (e.g., read-only memory (ROM), erasable programmable ROM (EPROM), electrically EPROM (EEPROM), etc.), and volatile memory 146 (e.g., random access memory (RAM)). A basic input/output system (BIOS) 148 may be stored in the non-volatile memory 144 and can include the basic routines that help to transfer information among elements within the computing device 136. The volatile memory 146 may also include a high-speed RAM, such as static RAM, for caching data.

The computing device 136 may further include or be coupled to a non-transitory computer-readable storage medium such as a storage device 150, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 150 and other drives associated with computer-readable media and computer-usable media may provide non-volatile storage of data, data structures, computer-executable instructions, and the like. Although the description of computer-readable media above refers to an HDD, it should be appreciated that other types of media that are readable by a computer, such as Zip disks, magnetic cassettes, flash memory cards, cartridges, and the like, may also be used in the operating environment, and, further, that any such media may contain computer-executable instructions for performing novel methods of the disclosed examples.

A number of modules can be stored in the storage device 150 and in the volatile memory 146, including an operating system 152 and one or more program modules 154 which may implement the functionality described herein in whole or in part. It is to be appreciated that the examples can be implemented with various commercially available operating systems 152 or combinations of operating systems 152. All or a portion of the examples may be implemented as a computer program product stored on a transitory or non-transitory computer-usable or computer-readable storage medium, such as the storage device 150, which includes complex programming instructions, such as complex computer-readable program code, to cause the processor device 138 to carry out the steps described herein. Thus, the computer-readable program code can comprise software instructions for implementing the functionality of the examples described herein when executed on the processor device 138. The processor device 138 may serve as a controller, or control system, for the computing device 136 that is to implement the functionality described herein.

An operator may also be able to enter one or more configuration commands through a keyboard (not illustrated), a pointing device such as a mouse (not illustrated), or a touch-sensitive surface such as a display device (not illustrated). Such input devices may be connected to the processor device 138 through an input device interface 156 that is coupled to the system bus 142 but can be connected by other interfaces, such as a parallel port, an Institute of Electrical and Electronic Engineers (IEEE) 13138 serial port, a Universal Serial Bus (USB) port, an infrared (IR) interface, and the like.

The computing device 136 may also include a communications interface 158 suitable for communicating with a network as appropriate or desired. The computing device 136 may also include a video port 160 to interface with a display device to provide information to a user. Individuals will recognize improvements and modifications to the preferred examples of the disclosure. All such improvements and modifications are considered within the scope of the concepts disclosed herein and the claims that follow.

What is claimed is:

1. A computing device, comprising:
a system memory; and
a processor device communicatively coupled to the system memory, the processor device to:
determine, in a current thread, that a first future object representing a result of a first asynchronous operation has a status of complete;
determine that the current thread is not associated with a completion queue; and
responsive to determining that the current thread is not associated with a completion queue:
create a completion queue associated with the current thread;
perform a completion operation of the first future object;
determine, in the current thread as a result of performing the completion operation of the first future object, that a second future object representing a result of a second asynchronous operation has a status of complete;
determine that the current thread is associated with the completion queue; and
responsive to determining that the current thread is associated with the completion queue, enqueue a completion operation of the second future object in the completion queue.

2. The computing device of claim 1, wherein the processor device is further to, further responsive to determining that the current thread is not associated with a completion queue:
determine that the completion queue is not empty; and
responsive to determining that the completion queue is not empty:
dequeue a completion operation from the completion queue; and
perform the dequeued completion operation.

3. The computing device of claim 1, wherein the processor device is further to, further responsive to determining that the current thread is not associated with a completion queue:
determine that the completion queue is empty; and
responsive to determining that the completion queue is empty, remove the completion queue.

4. The computing device of claim 1, wherein the first future object and the second future object each comprise an instantiation of a custom class implemented using an object-oriented programming language.

5. The computing device of claim 1, wherein:
the first future object and the second future object each comprise an instantiation of a Java Future class; and
the completion operation of the first future object and the completion operation of the second future object each comprises a custom method.

6. The computing device of claim 1, wherein the completion queue comprises an instantiation of a Java LinkedList class.

7. The computing device of claim 1, wherein the completion queue is associated with the current thread using a Java ThreadLocal class.

8. A method, comprising:
determining, by a processor device in a current thread, that a first future object representing a result of a first asynchronous operation has a status of complete;
determining that the current thread is not associated with a completion queue; and
responsive to determining that the current thread is not associated with a completion queue:
creating a completion queue associated with the current thread;
performing a completion operation of the first future object;
determining, by the processor device in the current thread as a result of performing the completion operation of the first future object, that a second future object representing a result of a second asynchronous operation has a status of complete;
determining that the current thread is associated with the completion queue; and
responsive to determining that the current thread is associated with the completion queue, enqueuing a completion operation of the second future object in the completion queue.

9. The method of claim 8, further comprising, further responsive to determining that the current thread is not associated with a completion queue:
determining that the completion queue is not empty; and
responsive to determining that the completion queue is not empty:
dequeuing a completion operation from the completion queue; and
performing the dequeued completion operation.

10. The method of claim 8, further comprising, further responsive to determining that the current thread is not associated with a completion queue:
determining that the completion queue is empty; and
responsive to determining that the completion queue is empty, removing the completion queue.

11. The method of claim 8, wherein the first future object and the second future object each comprise an instantiation of a custom class implemented using an object-oriented programming language.

12. The method of claim 8, wherein:
the first future object and the second future object each comprise an instantiation of a Java Future class; and
the completion operation of the first future object and the completion operation of the second future object each comprises a custom method.

13. The method of claim 8, wherein the completion queue comprises an instantiation of a Java LinkedList class.

14. The method of claim 8, wherein the completion queue is associated with the current thread using a Java ThreadLocal class.

15. A non-transitory computer-readable medium having stored thereon computer-executable instructions that, when executed, cause one or more processor devices to:
determine, in a current thread, that a first future object representing a result of a first asynchronous operation has a status of complete;
determine that the current thread is not associated with a completion queue; and
responsive to determining that the current thread is not associated with a completion queue:
create a completion queue associated with the current thread;
perform a completion operation of the first future object;
determine, in the current thread as a result of performing the completion operation of the first future object, that a second future object representing a result of a second asynchronous operation has a status of complete;
determine that the current thread is associated with the completion queue; and
responsive to determining that the current thread is associated with the completion queue, enqueue a completion operation of the second future object in the completion queue.

16. The non-transitory computer-readable medium of claim 15, wherein the computer-executable instructions further cause the one or more processor devices to, further responsive to determining that the current thread is not associated with a completion queue:
determine that the completion queue is not empty; and
responsive to determining that the completion queue is not empty:
dequeue a completion operation from the completion queue; and
perform the dequeued completion operation.

17. The non-transitory computer-readable medium of claim 15, wherein the computer-executable instructions further cause the one or more processor devices to, further responsive to determining that the current thread is not associated with a completion queue:
   determine that the completion queue is empty; and
   responsive to determining that the completion queue is empty, remove the completion queue.

18. The non-transitory computer-readable medium of claim 15, wherein the first future object and the second future object each comprise an instantiation of a custom class implemented using an object-oriented programming language.

19. The non-transitory computer-readable medium of claim 15, wherein:
   the first future object and the second future object each comprise an instantiation of a Java Future class; and
   the completion operation of the first future object and the completion operation of the second future object each comprises a custom method.

20. The non-transitory computer-readable medium of claim 15, wherein:
   the completion queue comprises an instantiation of a Java LinkedList class; and
   the completion queue is associated with the current thread using a Java ThreadLocal class.

\* \* \* \* \*